United States Patent [19]

Ratskó et al.

[11] 4,344,640
[45] Aug. 17, 1982

[54] APPARATUS FOR THE PREVENTION OF JACKKNIFING OF ARTICULATED VEHICLES

[75] Inventors: István Ratskó; József Ivony; Jenö Mádi; György Karász, all of Budapest, Hungary

[73] Assignees: Autòipari Kutatò Intèzet; Ikarus Karosszèria ès Jàrmügyàr, both of Budapest, Hungary

[21] Appl. No.: 180,092

[22] Filed: Aug. 21, 1980

[30] Foreign Application Priority Data

Aug. 21, 1979 [HU] Hungary .............................. AU 428

[51] Int. Cl.$^3$ ............................................. B62D 53/06
[52] U.S. Cl. .................................................... 280/432
[58] Field of Search ..................... 280/432, 446 B, 474

[56] References Cited

U.S. PATENT DOCUMENTS 4,106,792 8/1978 Schultz et al. ..................... 280/432

FOREIGN PATENT DOCUMENTS 2806751 8/1979 Fed. Rep. of Germany ...... 280/432
2038740 7/1980 United Kingdom ................ 280/432

Primary Examiner—John A. Pekar
Attorney, Agent, or Firm—Gabriel P. Katona

[57] ABSTRACT

An antijackknifing apparatus for an articulated vehicle has an angle evaluating unit and an articulation locking mechanism including a locking activator unit. A control signal is produced corresponding to the sign of the deviation of the angle of articulation, the sign being positive when disposed to the right when viewed from above in the direction of movement and being negative when disposed to the left. The locking actuator unit also receives a direction signal which is positive when the change in the angle of articulation of the vehicle when view from above is clockwise and negative when counterclockwise. The locking activator unit goes into a locked condition when two opposite sign input signals are applied thereto.

7 Claims, 5 Drawing Figures

APPARATUS FOR THE PREVENTION OF JACKKNIFING OF ARTICULATED VEHICLES

BACKGROUND OF THE INVENTION

Our invention is an apparatus for preventing jackknifing in an undesired direction in an articulated vehicle, which has a locking unit inserted between the front part and the trailer of the articulated vehicle. The locking unit is operably connected to a control apparatus the input signals of which are provided by the wheel steering angle, and the change in angle of articulation in the other direction.

There are anti-jackknife devices known for preventing jackknifing of saddle-type tractor-trailers, in which there is a double-acting hydraulic working cylinder between the tractor and semi-trailer. The piston of the cylinder is arranged from the tractor and the working cylinder is attached to the element of the saddle-type connecting device which rotates with the trailer. The two working chambers of the double-acting working cylinder are connected with a passage in which a valve unit is arranged (as is described e.g. in U.S. Pat. No. 2,692,146).

When the valve unit is closed, the hydraulic fluid cannot pass between the two working chambers, and then the relative angle between the two parts of the vehicle remains constant, i.e. the vehicle cannot jackknife.

The hydraulic fluid can pass between the two working chambers, when the valve unit is open and the angular disposition of the two vehicle parts can change and the anti-jackknifing unit will not prevent such change.

Various solutions are known for the control of the valve unit, which influence the control of the valve unit through sensing various vehicular parameters or passage-dynamical characteristics or a plurality of characteristics, respectively.

There are solutions known in which the control valve unit is in connection with the braking system of the vehicle and a jackknife-preventing effect is created during braking, such as in the apparatus described in British Pat. No. 1,240,554.

In a further proposed solution according to British Pat. No. 1,291,858 the valve of the liquid passage connecting the working chambers of the double-acting hydraulic working cylinder, is mechanically connected to the steering mechanism; with an open valve position corresponding to wheels when they are steered to one side.

The joint effect of a plurality of driving-dynamical factors contributes to the formation of a jackknifing condition in articulated vehicles. The aforesaid two British patents take into consideration only one selected factor each, therefore, other than in the case of braking and sideways steering, respectively, they do not prevent jackknifing.

These devices have not found any widespread application in practice.

There is also known from West German published patent application No. 2,420,203 a rear axle-driven articulated bus, in which the control unit of the valve of the hydraulic working cylinder that hinders jackknifing, has two sensors, one of them sensing the steering angle and the other the angle of articulation of the two vehicle units. A permitted maximum angle of articulation corresponding to a given angle of turn of steering, is stored in the control unit. A comparing unit compares the sensed and permitted angles of articulation, and when the latter is exceeded the control unit closes the valve of the hydraulic working cylinder, i.e. fixes the anti-jackknife apparatus.

The aforementioned West German device—which in our view is the most developed one—is truly capable of setting a suitable limit for the size of the jackknifing angle thus it prevents a dangerous degree of overarticulation of the vehicle onto itself. A not lesser dangerous operating condition—especially in the case of rear axle drives—is the acceleration in a sharp curve, because in this case a considerable part of the friction that is available on the rear axle, is consumed by the diving moment and thus the rear axle is not capable of countering the centrifugal force. The trailer part then proceeds in the direction of straightening out and then articulates into the opposite direction. This phenomenon is especially dangerous for the traffic in the adjacent lane, especially, because this phenomenon cannot be directly sensed by the driver. (He can immediately sense the slippage of any axis of the tractor, and can compensate for that.)

In addition to the prevention of overarticulation and irregular straightening out, our aim in creating the invention was also to bring about a highly reliable, low cost apparatus which still performs its function accurately.

In creating the device of the invention it was our aim to provide such an angle of articulation-affecting apparatus which prevents jackknifing when the vehicle breakes in a straightaway or in a curve, prevents the swerving of the trailer in a curve, and prevents the special kind of jackknifing which occurs especially in the case of trailers with driven shafts.

The apparatus of the invention prevents only that kind of articulation, the direction of which does not correspond to the sum of the steering angle and of the angle of articulation in the direction determined by the slippage-free progress of the wheels of the vehicle.

I. Our invention is an apparatus for articulated vehicles for preventing articulation in an extraordinary direction, having a locking means connected to the parts of the vehicle that are connected by the articulating hinge, the locking means being operatively connected to an angular position evaluating unit for evaluating the angle of articulation which deviates from a predetermined angle of articulation that corresponds to the steered angle of the front wheel, which unit is arranged with the sensor for the steered angle of the front wheels of the front part of the vehicle and the sensor for the angle of articulation. The evaluating unit is connected to the actuating unit of the articulation locking means, one entering signal of which is the deviation signal determined by the exit signal of the angle evaluating unit, the deviation signal—according to choice—is positive at that angle of articulation ($\beta$), at that angle of wheel steering ($\alpha$) to which an angle of articulation ($\beta p$) belongs, that is to the right when looking down at the vehicle in the direction of its progress, and is negative at that angle of articulation ($\beta$) which is at the angle of articulation ($\beta p$) belonging to a steered angle ($\alpha$) that is to the left; the other input signal of the operating unit of the locking means is formed by the prefix of the exit signal of the angle-of-articulation direction signaler which—according to choice—is positive at that direction of change in angle of articulation at which when viewed from above, the articulation of the trailer part to the front part is in a clockwise direction, and is negative at that direction of change of angle of articulation at which the articulation of the trailer part to the front part is counterclockwise, and the locked position of the articulation locking means corresponds to the two opposed sign signals of the locking actuating unit. In the angular position evaluating unit the exit signal suitably corresponds to the angle of articulation ($\beta$) which lies outside the angle domain ($\Delta\beta$) which includes the angle of articulation ($\beta$p) corresponding to the steered angle ($\alpha$) of the front wheel.

II. In a suitable embodiment of our invention the articulation locking means is formed as a piston-operated hydraulic working mechanism the two operating chambers of which are connected to the locking actuating unit by means of hydraulic lines; the actuating unit for the locking mechanism is formed by a three position, four-path direction-changing valve as well as an inner hydraulic loop which contains a check valve; the first working chamber is connected by a hydraulic line to the first connection of the four-path, three-position direction-changing valve, the second working chamber is connected by a hydraulic line to its second connection, and an inner hydraulic loop is connected to its third and fourth connections with a check valve closing off flow from the direction of the third connection towards the fourth one; in the resting center position of the piston of the three-position, four-path direction-changing valve at least the first, second and fourth connections are open to each other, in positively driven position the first and fourth connections, as well as the second and third connections, and in negatively driven position the first and third positions as well as the second and fourth positions, respectively, are connected to each other; the articulation locking means simultaneously forms the articulation direction-giving means by the open position of the check valve forms a positive output signal when the three-position, four-path direction-changing valve is in a positive position, and when the three-position, four-path direction-changing valve is in a negative position then it forms a negative output signal, the closed position of the check valve provides in the positive position of the three-position, four-path direction-changing valve a negative output, and in the negative position of the three-position, four-path direction changing valve it forms a positive output signal.

III. In a further preferred embodiment of our invention the angular position-evaluating unit is formed by a spring arranged between the sensing piston connected to the transmitting element of the steering signaler and an end of the piston of the three-position, four-path direction-changing valve, as well as a spring arranged between the sensing piston supported by the cam formed on the guidance rod connected to the transmitting element of the articulation angle signaler, and this sensing piston, and the other end of the three-position, four-path direction-changing valve.

IV. In a further advantageous embodiment of our invention the angular position-evaluating unit is provided by a cam formed on a rotating segment, a cam formed on a rotating segment connected to the connecting element of the angle of articulation signaler, a difference-formng arm which is supported through sensors by the above and is disposed in an axially movable manner on a slide valve that has a limited possibility of movement between abutments, said arms being arranged between abutting terminal elements and being supported by a spring and mounted rotatably about a slide, and a three-position, four-path direction changing valve and its slide valve which is in motion transmitting connection with the aforesaid slide valve.

In the interest of the satisfactory operation of the hydraulic system it is under constant initial pressure through the container of the liquid, suitably by the aid of the pneumatic braking system of the vehicle.

BRIEF DESCRIPTION OF THE DRAWING

We present our invention in detail with the aid of FIGS. 1-5, through three working embodiments, in which.

DETAILED DESCRIPTION OF THE PREFERRED EMBODIMENTS

Figure 1:
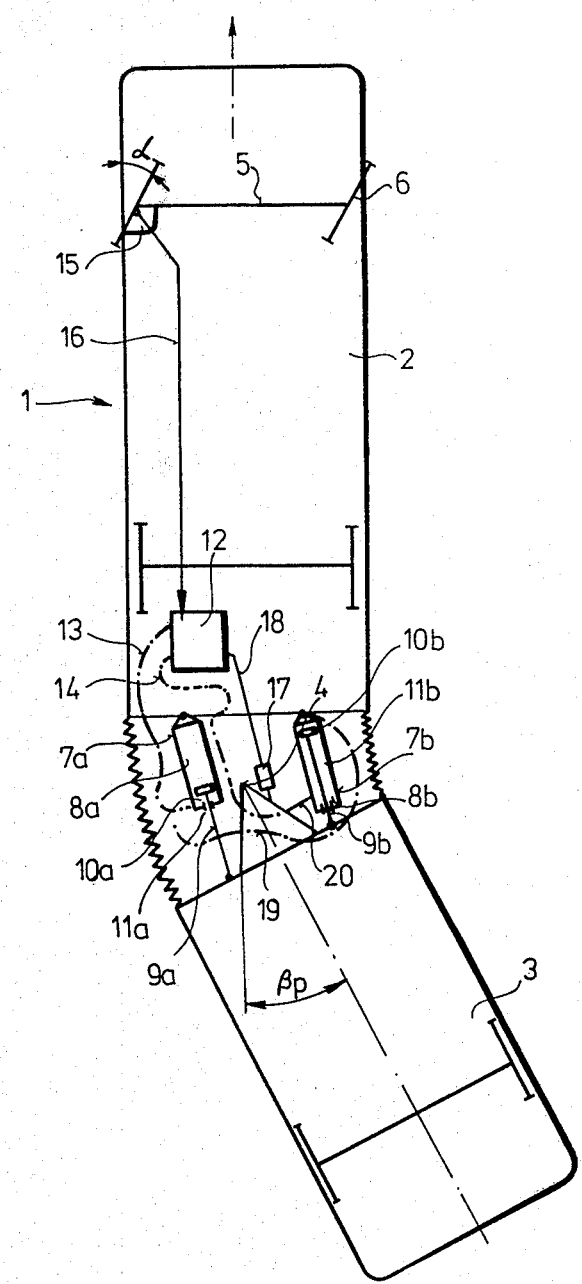
FIG. 1 shows the arrangement of the hydraulically operated angle of articulation-influencing apparatus in an articulated bus.
Figure 2:
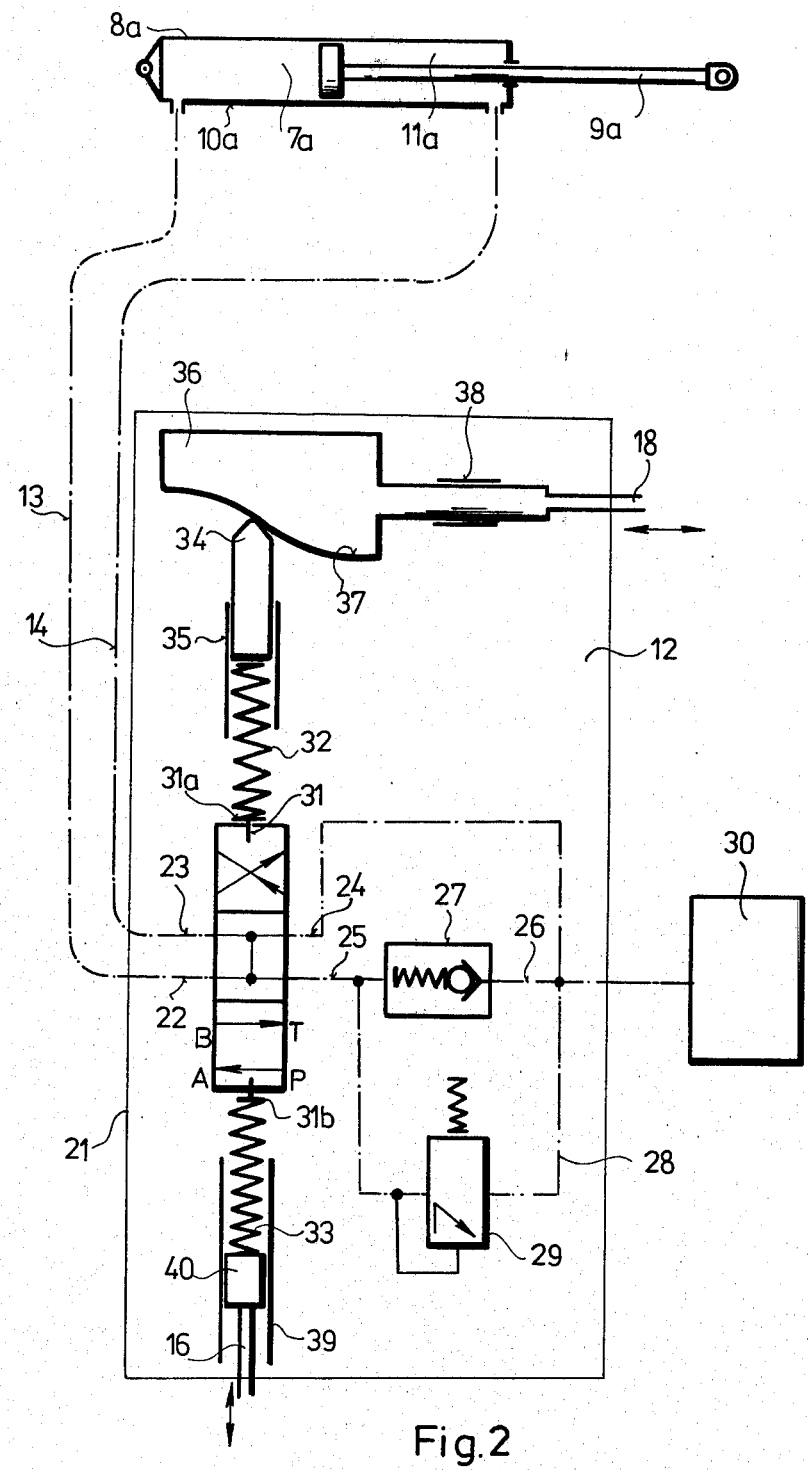
FIG. 2 shows the hydraulic part of the apparatus and its control unit.
Figure 5:
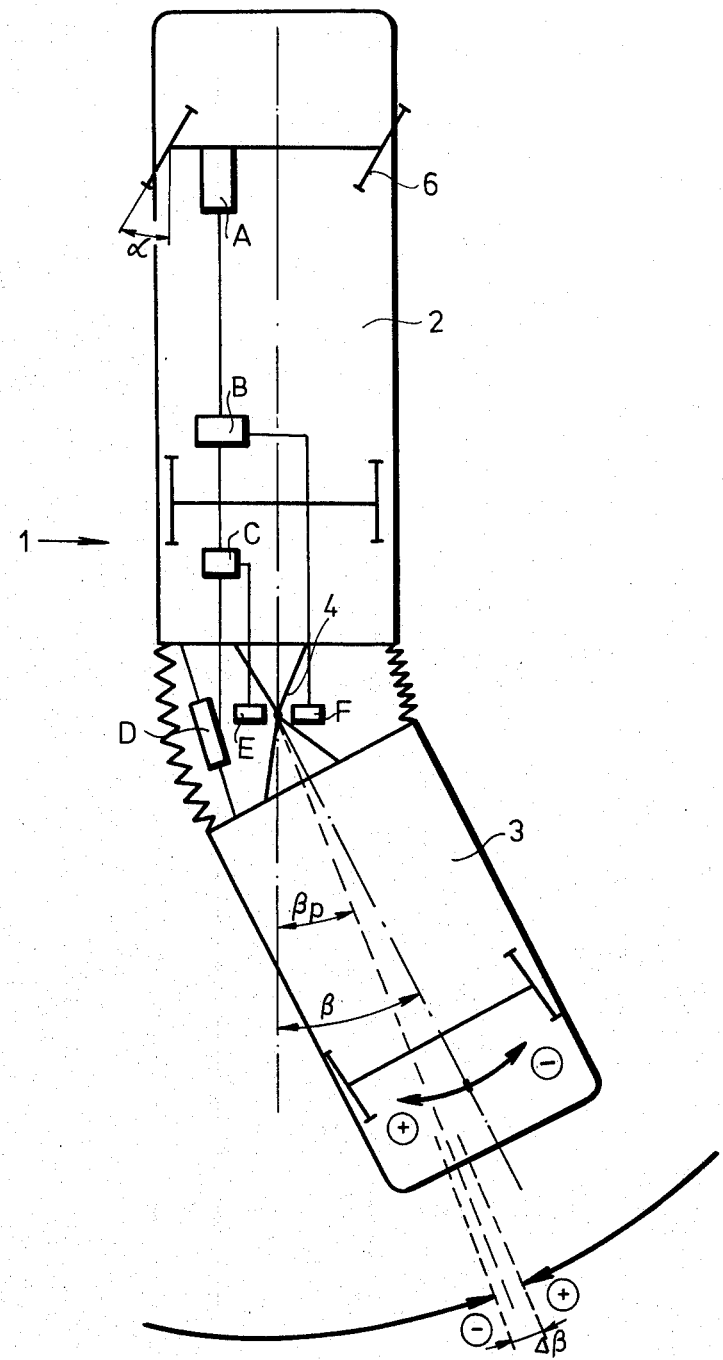
FIG. 5 shows the block diagram of the angle of articulation-influencing apparatus and the signs required for explaining its operation.

The articulated trailer vehicle 1 comprises two vehicular units, a front car 2 and a trailer 3, which are connected by a hinge 4. The front axle 5 of the front car 2 is steered and in the figure the steered angle of the front wheel is represented by the sign $\alpha$. The angle of articulation between the front car 2 and the trailer 3 is represented by the sign $\beta$. A steered angle-sensing unit a for the wheel is connected to the not shown steering mechanism of the front axle 5, as shown in FIG. 5, an angle of articulation sensor F is inserted between the two vehicle parts, between the front car 2 and the trailer 3, and both are connected to the angle-evaluating unit B which provides as its exit signal the deviation from from the angle of articulation $\beta$p which is determined by the front wheel steered angle $\alpha$ and the real angle of articulation $\beta$. The angle of articulation $\beta$p which belongs to the steered angle $\alpha$ of the front wheel 6, when the steered angle $\alpha$ is held constant, on a flat road when the wheels roll without sliding, is the constant angle of articulation $\beta$. A direction giver E for the angle of articulation is arranged between the front car 2 and the trailer 3 to sense the change of the angle of articulation $\beta$, which is connected, together with the angular position evaluating unit B, to the locking actuator C of the articulation locking unit D. One input signal of the locking actuating unit C is the deviation sign determined by the angular position-evaluating unit B, which deviation sign, as chosen, is positive at that angle of articulation $\beta$ which is disposed to the right when the articulated vehicle is viewed from above and in the direction of travel, from the angle domain $\Delta\beta$ containing the angle of articulation $\beta$p belonging to the steered angle $\alpha$; and the deviation sign is negative at that angle of articulation $\beta$p which is disposed to the left from the angle domain $\Delta\beta$ contain the angle of articulation $\beta$p belonging to the steered angle $\alpha$. The other input signal of the locking actuator unit C is provided by the directional sign which forms the output the output signal of the direction giver E for the angle of articulation, which, as chosen, is positive at that direction of change of angle of articulation at which the direction of articulation of the trailer 3 relative to the front car 1 is in the clockwise direction when the articulated vehicle 1 is viewed from above, and is negative at that direction of change of angle of articulation at which the articulation of the trailer 3 relative to the front car 2 is in the counterclockwise direction, and the locked position of the articulation locking unit D corresponds to the two opposed sign input signals of the locking actuating unit C. FIG. 1 shows the constructional embodiment solved with a hydraulic locking mechanism in the articulated vehicle 1, and FIG. 2 shows the hydraulic connection together with the associated mechanical elements. The unit for sensing the steering angle of the front wheel 6 is formed as a degree of steering signaler 15 that is connected to the steering apparatus (not shown) and a connecting element 16 that is connected to the signaler. The angle of articulation sensor unit F is formed as an angle of articulation signaler 17 disposed between the front car 2 and the trailer 3, and a connecting element 18 connected to the signaler. The articulation locking unit D is formed as a double-action hydraulic working unit 7a, 7b with piston and as a locking actuator C that is formed as a part of a control unit 12 that is connected by hydraulic lines 13 and 14 to the working chambers 10a, 10b, 11a and 11b of the hydraulic working unit. The cylinders 8a and 8b of the double-action hydraulic working units 7a and 7b with piston, are fixed to the front car 2, and their pistons 9a and 9b are fixed to the trailer 3. One embodiment of the control unit 12 and the entire hydraulic circuit is shown in FIG. 2.

The central element of the control unit 12 is the three-position, four-path hydraulic direction changing valve, the first connection 22 of which is connected with the line 13 to the first working chamber 10 of the hydraulic working cylinder 6a, the connection 23 thereof is connected with the line 14 to the second working chamber 11. The third connection 25 of the hydraulic valve 21 is connected by a line forming an inner hydraulic loop 26 from the third connection 25 to a check valve 27 blocking the flow towards the fourth connection. In the resting center position of the slide valve 31 of the three-position four-path direction changing valve, all four connections 22, 23, 24 and 25 are connected open together, in the positively driven position the first connection 22 and the fourth connection 24 as well as the second connection 23 and the third connection 25 are connected, and in the negatively driven position the first connection 22 and the third connection 25, as well as the second connection 23 and the fourth connection 24 are connected open to each other. The open position of the check valve 27 in the positive condition of the three-position, four path direction changing valve 21 forms an output with a positive sign, and in the negative condition of the three-position, four-path direction changing valve 21 forms an output with a negative sign, the closed position of the check valve 27 forms at the positive condition of the three-position, four-path direction changing valve 21 an output with a negative sign, and in the negative condition of the three-position, four-path direction changing valve forms an output with a positive sign. An outer hydraulic loop 28 formed as a parallel connection with the check valve, encircles the check valve, in which outer hydraulic loop a pressure limiting valve 29 is arranged which limits the liquid pressure in the line branch between the third connection 25 and the check valve 27. A hydraulic vessel 30 is arranged connected to the line branch between the pressure limiting valve 29 and the fourth connection 24. The hydraulic valve 21 is of a slide valve construction and a spring 32 is supported on the front surface of the slide valve 31a, and it is pressed thereonto by a sensor 34 which is contacted by a cam 37 that is the output of a angle of articulation signaling device 36 controlled by a line 35. The output of the angle of articulation signaling device 36 is constructed as a control rod and is guided in a line 38 and is in motion-transferring connection through the connecting element with the angle of articulation signaler 17. A spring 33 is supported by the other front surface 31b of the slide valve 31, which spring 33 with the slide valve 40 that is the output through the line 39 is connected with the degree of steering signaler 15.

The length of the spring 13 is selected so that the path of the spring is greater than the largest distance of travel of the sensor slide valve 34. Similarly, the spring path of the spring 33 is greater than the largest displacement of the extent of steering signaling device 40.

Figure 3:
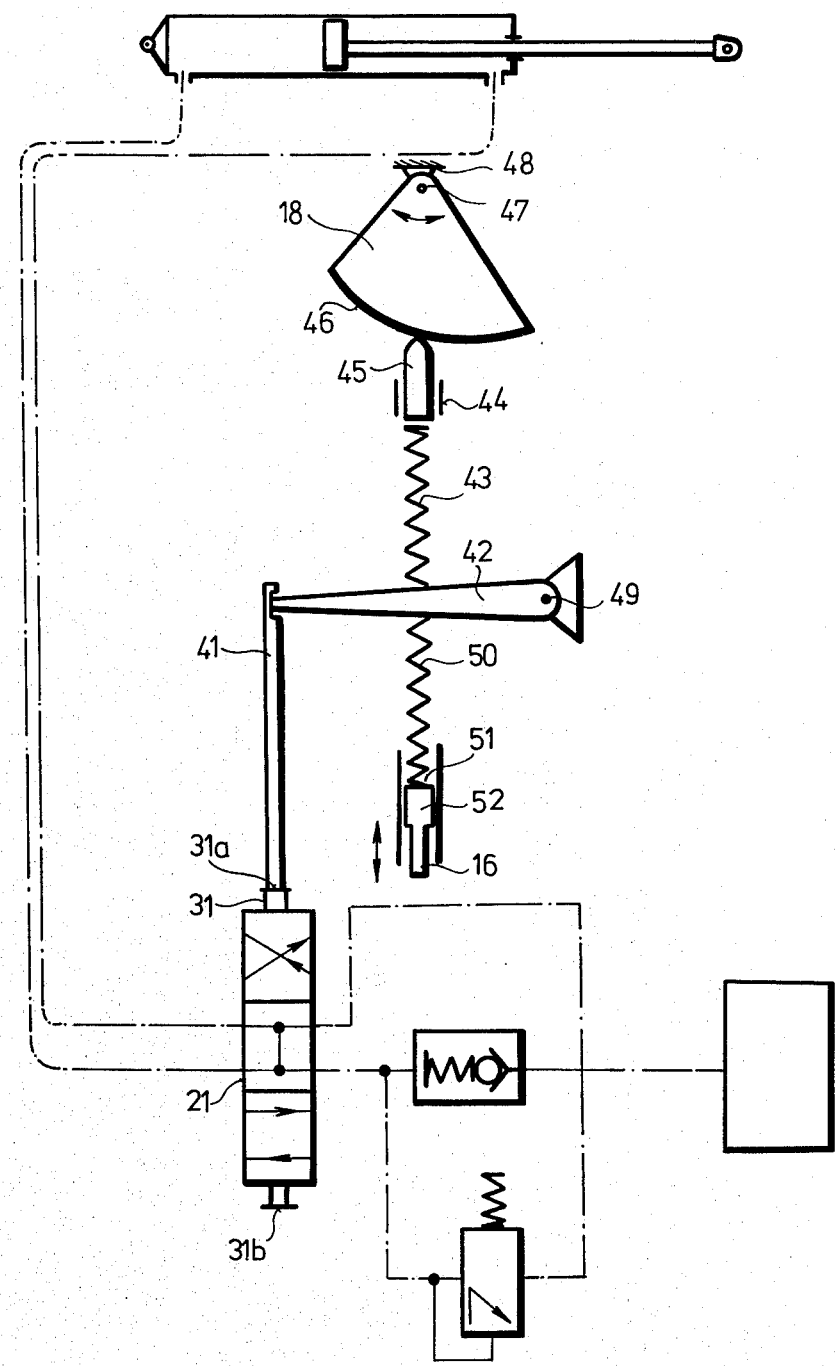
FIG. 3 shows the hydraulic part of the apparatus with pivoting control unit.

According to the embodiment of FIG. 3, identically to the above embodiment, the equilibrium position of the springs determines the position of the slide valve 31 of the three-position, four-path direction changing valve 21, in an indirect manner, by the aid of a lever arm. A push bar 41 is connected without any slack to the slide valve of of the hydraulic valve 21, the bar being in a motion-transferring with a rocker 42 journaled on a pin 48. Springs 50 and 43 rest opposed to the rocker 42, the spring 43 is compressed by a sensing slide valve 45 supported by a cam 46 that is guided in a slide 44. The cam 46 is formed on a segment 47 journaled for rotation about the pin 48, the cam being in a motion-transferring connection through the transmitting or connecting element 18 with the angle of articulation signaler 17. The spring 50 is compressed by a degree of steering signaler 52 formed as a slide valve guided in a line 51 against rocker arm 42, which is in connection with the degree of steering signaler 15 through the former connecting element 16.

Figure 4:
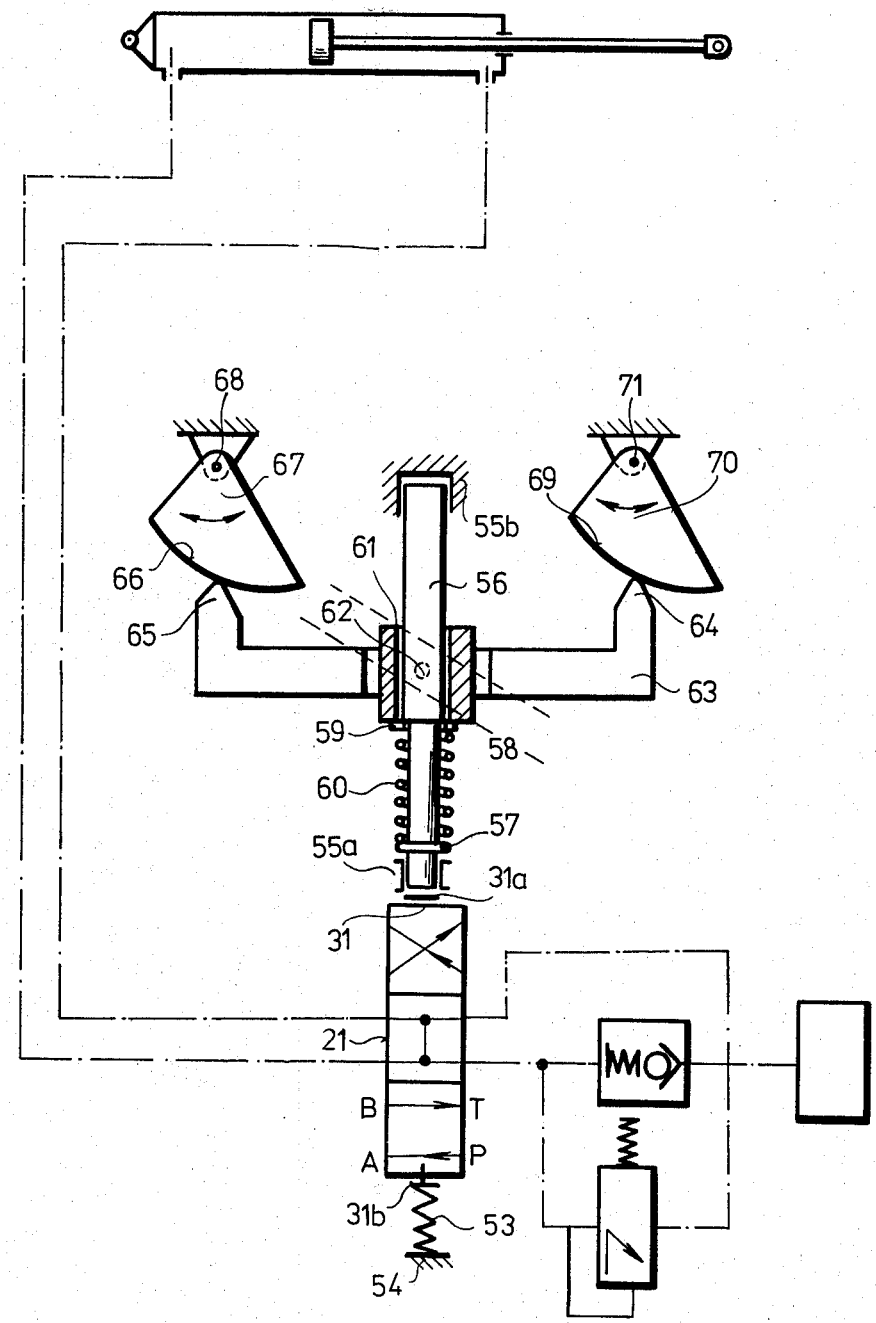
FIG. 4 shows the hydraulic part of the apparatus with two armed lever lifting arm control unit.

In the embodiment of FIG. 4 a pre-biased compression spring 53 is supported on the front surface 31b of the slide valve 31 of the hydraulic valve 21, the other end of the spring sits on a fixed support 54. A slide valve 56, that is guided in bushings 55a and 55b, is supported on the front surface 31a of the slide valve 31. A spring supporting ring 57 is fixed to the slide valve 56, on which one end of a compression spring 60 is supported, the pre-biased compression force of said spring 60 being greater than the spring force in any position of the spring 53, the other end of the spring 60 presses a supporting ring against a shoulder 58 of the slide valve 56. In the central position of the slide valve 31 a sensor formed as a two armed lever 63 is arranged onto a crosspin 62 of a guide bushing 61 which sits on the supporting ring 59.

One contact surface 65 of the two armed lever 63, is supported on the output of the angle of articulation signaler that is provided with a cam 66 formed as a rotating segment 67 that is arranged on a pin 68. The rotating segment 67 is in motion-transmitting contact through the the connecting element 18, with the angle of articulation signaler 17.

The other contact surface 64 of the two armed lever 63 is supported on the output of the degree of steering signaler having a cam 69 that is formed as a rotating segment 70 that is arranged on a pin 71.

The output of the degree of steering signaler formed as a rotating segment 71, is in motion-transmitting contact with the degree of wheel-steering angle signaler 15, through the connecting element 16.

The apparatus operates in the following manner: the articulation process of the front car 2 and the trailer 3 is directly influenced by the apparatus through the working cylinders 7a and 7b by choking, and respectively opening or closing the hydraulic connection between the working chambers 10a and 10b and respectively 11a and 11b, through the control unit 12. When the connection is closed then the apparatus counteracts the change in the angle of articulation $\beta$, with maximum countermoment.

We describe the hydraulic operation on the basis of FIG. 2. In the central position of the slide valve 31 of the direction changing valve 21, the direction changing valve 21 insures direct hydraulic connection between the first connection 22 and second connection 23. The piston 9a can move in the cylinder 8a in both directions without any hindrance, because the connection between the first working chamber 10a and the second working chamber 11a is assured through the lines 13 and 14. In the central position of the direction changing valve 21, that is widened by controlled slack, the apparatus does not manifest any resistance against the articulation process. When the slide valve 31 of the direction changing valve 21 moves in the direction of its end 31b, a negative condition obtains and hydraulic connection is established between the first connection 22 and third connection 25 as well as the second connection 23 and fourth connection 24.

In viewing the articulated vehicle 1 from above, the trailer 3 is related clockwise to the front car 2, therefore, in the case of a positive change in the angle of articulation the working cylinder 7a moves in the direction of compression, thus the hydraulic fluid flows from the first working chamber 10a of the working cylinder 7a through the line 13, the first connection 22, the direction changing valve 21 and the third connection 25, and the check valve 27 is closed in view of its resistance to a positive output signal change in the angle of articulation. Thus the apparatus is locked against an articulation process in the positive direction, i.e. it exerts a momentum against any further articulation process in that direction. To limit the magnitude of the counter momentum, the fluid can reach the second working chamber 11a of the working cilinder 7a, avoiding the check valve 27, through the outer hydraulic loop 28, its pressure limiting valve 29, the fourth connection 24, the second connection 23 and the line 14. The piston 9a has to defeat the pressure determined by the pressure limiting valve, in the first working chamber 10a.

The fluid arrives from the working chamber 11a of the working cylinder 7a to the first working chamber 10a when the working cylinder 7a is moved in the direction of pull, i.e. in the case of negative change in the angle of articulation, through the line 14 to the second connection 23 of the direction changing valve 21 and then from the fourth connection 24 through the inner hydraulic loop 26 and its check valve 27 which is open at the negative output signal of the change in the angle of articulation. A flow in this direction does not require an appreciable pressure differential between the working chambers. If the slide valve 31 of the direction changing valve 21, moves in the direction of its end 31a reaching a positive position, a hydraulic connection is established between the first connection 22 and the fourth connection 24 as well as the second connection 23 and third connection 25. When the working cylinder 7a is moved in the direction of compression, i.e. in the case of a positive change in the angle of articulation, the hydraulic fluid flows from the first working chamber 10a of the working cylinder 7a to the second working chamber 11a of the working cylinder 7a, through the line 13, the first connection 22 to the fourth connection 24, and then through the internal hydraulic loop 26 and its check valve 27 which is open in the case of a positive output signal in the direction of change of the angle of articulation, to the third connection of the direction changing valve 21 and from the connection 23 through the line 14. A flow in this direction does not require an appreciable pressure differential between the working chambers. When the working cylinder 7a is moved in the direction of pull, i.e. in the case of a negative change in the angle of articulation, the fluid flows from the working chamber 11a of the working cylinder 7a to the first working chamber 10a, through the line 14 to the second connection 23 of the direction changing valve and through the direction changing valve 21 from its third connection 25 since the check valve 27 is closed against flow in this direction when the output signal of the change of direction of the angle of articulation is negative, it can pass through only the outer hydraulic loop 28 and its pressure limiting valve 29 to the fourth connection 24, through the direction changing valve 21 to the first connection 22 and through the line 13. The piston 9a has to defeat the pressure determined by the pressure limiting valve 29 in the second working chamber 11a.

The constructional configuration of the parts actuating the slide valve 31 functions as follows:

The displacement of the sliding valve 31 forms the output signal of the angular position evaluating unit B, which depends from the sum of the steering away signal and the signal of articulation. The degree of steering signaler slide valve 15 is displaced in the direction of the control slide valve 31 when steering is to the left, the sensor 34 is moved in the direction of the control slide valve 31 by the cam 37 that is the output of the angle of articulation 36 attached to the connecting element 18 of the angle of articulation signaler 17, when the trailer 3 is moved due to the change in the angle of articulation in the positive direction, the shape of the cam 37 and the stiffness of the springs 32 and 33 being chosen so that when any steering away angle $\alpha$ and the angle of articulation corresponding to it take place at the same time ($\beta = \beta p$), the equilibrium of the springs 32 and 33 takes place at the resting central position of the slide valve 31, thus the slide valve does not lock the hydraulic circuits of the working chambers 7 and 11.

When the angle of articulation $\beta p$ pertaining to the angle of steering away $\alpha$ can be obtained by the actual articulated vehicle 1 by articulation from the actual angle of articulation position $\beta$ by means of articulation in the negative direction, then the equilibrium of the springs 32 and 33 was displaced in the direction of the end 31b of the slide valve 31 which is a position providing a signal evaluating negative angular position, and especially in the case of a larger difference it abuts at the end position of the slide valve 31. The structural parts actuating the slide valve 31, according to the embodiment shown on FIG. 3, operate as follows:

When steering towards the left occurs, then the slide valve which provides the output of the degree of steering signaler 52 fixed to the the connecting element 16 of the degree of steering signaler 15, is displaced in the direction of the rocker 42.

In the case of an articulation of the trailer 3 in the positive direction, the segment 17 connected to the connecting element 18 of the angle of articulation signaler 17, will turn in the clockwise direction.

The shape of the cam 46, and the stiffness of the springs 43 and 50 are selected so that, when we consider the arm ratio of their support on the rocker 42, when any angle of steering $\alpha$ and its corresponding angle of articulation $\beta p$ occur at the same time ($\beta = \beta p$) the equilibrium obtains in the central position of the slide valve 31. If the articulated vehicle 1 can achieve the angle of articulation $\beta p$ belonging to the wheel steering angle $\alpha$, from the actual articulation angle position $\beta$ by means of negative direction of articulation, then the equilibrium of the springs 43 and 50 moved towards the end 31b of the slide valve 31 that is moved by the rocker 42, the position of said end providing the negative angle evaluating signal, and in the case of an even greater difference it abuts moving to the extreme end position of the slide valve 31.

If the articulated vehicle 1 can achieve the angle of articulation $\beta p$ belonging to the steering angle $\alpha$ from the actual angle of articulation position $\beta$ only by articulation in the positive direction, then the equilibrium of the springs 43 and 50 was displaced in the direction towards the end 31a of the slide valve 31 that is moved by the rocker 42, in its position forming a signal evaluating a positive angular condition, but in the case of an even larger difference it abuts moving to the extreme end position of the slide valve 31. The constructional embodiment shown on FIG. 4, of the structural parts actuating the slide valve 31, operates as follows:

In the case of a change in the articulation of the trailer 3 in the positive direction the segment 67 connected to the connecting element 18 of the angle of articulation signaler, will turn in the clockwise direction. The transmitting element 16 of the degree of articulation signaler 15, turns the segment 70 in a counterclockwise direction when steering takes place towards the left. Since the prestressing of the spring 60 is greater then that of the spring 53, the guide bushing 61 and the slide valve 31 are displaced to the same extent within the range of movement of the slide valve 31. When the end 31a of the slide valve abuts in its extreme position, the front surface of the guide bushing 61 separates from the supporting ring 59 and the slide valve 56 can move in the opposite direction from the hydraulic valve 21.

The shapes of the cams 69 and 66 and the arm ratio of the two armed lever 63 is chosen so that in the case when any steering away angle $\alpha$ and its corresponding angle of articulation $\beta p$ occur at the same time ($\beta = \beta p$) the slide valve remains in the central position.

If the articulated vehicle 1 can achieve the angle of articulation $\beta p$ corresponding to a wheel steering angle $\alpha$ from the actual angle of articulation position $\beta$ by means of articulation in the negative direction, then the guide bushing 61 and the supporting ring 59 abutting thereon as well as the slide valve 56 and the slide valve 31 of the three-position, four-path direction changing valve 21 are brought opposite to the spring 53 in a position moved into the direction of the end 31b forming a negative output evaluation signal, moved by the difference-forming arm 63 that is moved by the sensors 64 and 65, due to the rotation of the cams 66 and 69, and in the case of even larger differences it abuts at the end position of the slide valve 31. If the articulated vehicle 1 can achieve the angle of articulation $\beta p$ corresponding to the wheel steering angle $\alpha$ from the actual angle of articulation $\beta$ by means of articulation in the positive direction, then, due to the rotation of the cams 66 and 69, the difference-forming arm 63 which moves together with the sensors 64 and 65, is moved by the spring 53 on the slide 61 through the supporting ring 59, slide valve 56 and the slide valve 31 of the three-position, four-path direction changing valve 21 towards the ends 31a of the slide valve thus forming a positive angular position evaluating signal, and in the case of a greater differential until the end position of the slide valve 31.

In the three constructional embodiments of the structural parts actuating the slide valve 31 it can be equally stated that the articulated vehicle can achieve the angle of articulation $\beta p$ belonging to a wheel steering angle $\alpha$ from an actual angle of articulation $\beta$ by means of articulation in the negative direction, in which case the hydraulic circuit permits a negative change in the angle of articulation, and locks against a positive change in the angle of articulation.

If the articulated vehicle 1 can achieve an angle of articulation $\beta p$ belonging to a wheel steering angle $\alpha$ from its actual angle of articulation $\beta$ by means of articulation in the positive direction, then the slide valve 31 of the three-position four-path direction changing valve 21, reaches its positive angle evaluating signal generating position, at which time the hydraulic circuit permits a change of angle of articulation in the positive direction and locks against a change in the angle of articulation in the negative direction.

Accordingly, the apparatus permits a change in the angle of articulation only in the direction which corresponds to the kinematics of slippage-free rolling and locks against a change in angle of articulation in the opposite direction.

We claim:

1. In an anti-jackknifing apparatus for an articulated vehicle having articulation locking means connectable to the pivotally connected vehicle units, means for sensing the steered angle of the front wheels of the front unit and means for evaluating the deviation from the angle of articulation predetermined by the steered angle of the front wheel at the angle of articulation, the improvement wherein the articulation locking means includes locking actuator means and wherein the evaluating means includes first means for applying a control signal to the locking actuator means corresponding to the deviation sign which is determined as positive at that angle of articulation which is disposed to the right when viewed from above the vehicle in the direction of movement thereof from the angle of articulation corresponding to the wheel steering angle and as negative at that angle of articulation which is disposed to the left from the angle of articulation corresponding to wheel steering angle and second means for applying another input signal to the locking actuator means representing the direction sign which is predetermined as positive at that change in the angle of articulation at which when the vehicle is viewed from above the articulation of the trailing unit relative to the front unit is in the clockwise direction and as negative at that change in the angle of articulation at which the articulation of the trailing unit relative to the front unit is in the counterclockwise direction, and wherein the locking actuator means actuates the locking means into a locked condition when two opposite sign input signals are applied thereto.

2. The apparatus according to claim 1, wherein the first means produces the control signal corresponding to an actual angle of articulation which lies in a predetermined angular range that includes the desired angle of articulation determined by the steering angle of the front wheel.

3. The apparatus according to claim 1, wherein the articulation locking means comprises hydraulic working means including a piston having two working chambers connected by hydraulic lines to the locking actuator means, the locking actuator means comprising a three-position, four-path direction changing slide valve connected to the hydraulic lines of the working chambers and the first working chamber being connected by one hydraulic line to a first connection of the four-path, three-position direction changing valve, the second working chamber is connected to a second connection by another hydraulic line, an inner hydraulic loop with a check valve for closing flow from third to fourth; connections wherein in the central resting position of the slide the three-position, four-path direction changing valve at least the first connection, the second connection and the fourth connection are connected together, in a positively driven position the first connection and the fourth connection as well as the second connection and the third connection are connected together, and in a negatively driven position the first connection and the third connection as well as the second connection and fourth connection are open to each other, wherein the articulation locking means defines the direction of the angle of articulation such that in the open position of the check valve in the positive position of the three-position, four-path direction changing valve it provides an output signal having a positive sign, and in the negative position of the three-position, four-path direction changing valve it provides an output signal having a negative sign, the closed position of the check valve providing in the positive position of the three-position, four-path direction changing valve an output signal having a negative sign, and in the negative position of the three-position four-path direction changing valve provides an output signal having a negative sign.

4. The apparatus according to claim 3, wherein the steered angle sensing means comprises a degree of steering signaler and a connecting element connected thereto and the evaluating means comprises an angle of articulation sensor including an angle of articulation signaler and a connecting element connected thereto.

5. The apparatus according to claim 4, wherein the evaluating means further comprises a sensing sliding valve connected to the connecting element of the degree of steering signaler, a spring disposed between the sensing slide valve and one end of the sliding valve of the three-position, four-path direction changing valve as well as from a spring disposed between a sensing slide valve and the other end of the slide valve of the three-position, four-path direction changing valve and a cam contacting said sliding valve, the cam formed on a control rod that is connected to the connecting element of the angle of articulation signaler.

6. The apparatus according to claim 4, wherein the evaluating means comprises a slide valve connected to the connecting element of the degree of steering signaler and from each compression spring having a rocker arm between them, said springs being supported by a cam formed from a rotating segment connected to the connecting element of the angle of articulation signaler and from the three-position, four-path direction changing valve connected to the rocker arm by means of its sliding valve.

7. The apparatus according to claim 4, wherein the evaluating means comprises a first cam formed from a first rotating segment connected to the connecting element of the angle of articulation signaler and a second cam formed from a second rotating segment connected to the connecting element of the angle of articulation signaler, a second slide valve supported by a spring arranged between abutting elements supported by the foregoing through sensors, formed on a slide valve having a path limited between abutments in an axially displaceable manner and a difference-forming arm disposed on a slide in a rotatable manner, and the sliding valve that is in motion-transferring contact with the said second slide valve, said sliding valve being that of a three-position, four-path direction changing valve.

* * * * *